United States Patent
Cherian et al.

(10) Patent No.: US 8,964,568 B2
(45) Date of Patent: Feb. 24, 2015

(54) SYSTEMS, METHODS, AND APPARATUS FOR MANAGING IP ADDRESSES AND NETWORK TRAFFIC IN WIRELESS NETWORKS

(75) Inventors: George Cherian, San Diego, CA (US); Jun Wang, La Jolla, CA (US); Ajith Tom Payyappilly, San Diego, CA (US); Suli Zhao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 393 days.

(21) Appl. No.: 13/277,170

(22) Filed: Oct. 19, 2011

(65) Prior Publication Data

US 2012/0099586 A1 Apr. 26, 2012

Related U.S. Application Data

(60) Provisional application No. 61/406,108, filed on Oct. 22, 2010.

(51) Int. Cl.
*H04L 12/26* (2006.01)
*H04L 29/12* (2006.01)
*H04W 76/04* (2009.01)

(52) U.S. Cl.
CPC ...... *H04L 61/2007* (2013.01); *H04L 29/12216* (2013.01); *H04L 29/12273* (2013.01); *H04L 43/10* (2013.01); *H04L 61/2053* (2013.01); *H04W 76/045* (2013.01)
USPC .......................................................... 370/241

(58) Field of Classification Search
USPC ............... 370/241, 241.1, 248, 389
See application file for complete search history.

(56) References Cited

U.S. PATENT DOCUMENTS

2007/0153790 A1 7/2007 Boers et al.
2008/0130560 A1 6/2008 Khandekar et al.
(Continued)

FOREIGN PATENT DOCUMENTS

| EP | 2136506 A1 | 12/2009 |
|---|---|---|
| EP | 2139189 A1 | 12/2009 |
| EP | 2182693 A1 | 5/2010 |

OTHER PUBLICATIONS

Sook-Jin Lee et al., "Keep-Alive Algorith based Periodic Ranging Code Group for detecting abnormal SS in WiBro System", Division of Mobile Communications, ETRI, pp. 1963-1966, Feb. 20-22, 2006.

(Continued)

*Primary Examiner* — Dang Ton
*Assistant Examiner* — Kevin Lee
(74) *Attorney, Agent, or Firm* — Abdollah Katbab

(57) ABSTRACT

Systems, methods and apparatus described herein include features that enable efficient management of keep-alive messages utilized to maintain IP addresses and/or PDN connections associated with idle data traffic channels. An access terminal may consolidate keep-alive messages for idle data traffic channels, reducing the number of keep-alive messages transmitted. An access terminal may select which idle data traffic channels to maintain, and may transmit a consolidated keep-alive message for associated IP addresses and/or PDN connections. Timers may be associated with PDN connections and sub-timers may be associated with IP addresses associated with a PDN connection. Keep-alive messages can be consolidated based on the timers, sub-timers and/or combination of timers and sub-timers. In a complementary method, a PDN gateway or other network node cooperates with access terminals to reduce network traffic. In another complementary method, the PDN gateway or other network node synchronizes the timers and/or sub-timers provided with an access terminal.

21 Claims, 12 Drawing Sheets

(56) References Cited

U.S. PATENT DOCUMENTS

| | | |
|---|---|---|
| 2008/0181161 A1 | 7/2008 | Gi Kim et al. |
| 2009/0319670 A1 | 12/2009 | Kang |
| 2010/0039956 A1 | 2/2010 | Zheng |
| 2010/0322124 A1 | 12/2010 | Luoma et al. |
| 2012/0224562 A1* | 9/2012 | MacDonald .................. 370/331 |

OTHER PUBLICATIONS

International Search Report and Written Opinion—PCT/US2011/057394—ISA/EPO—Jan. 18, 2012.

* cited by examiner

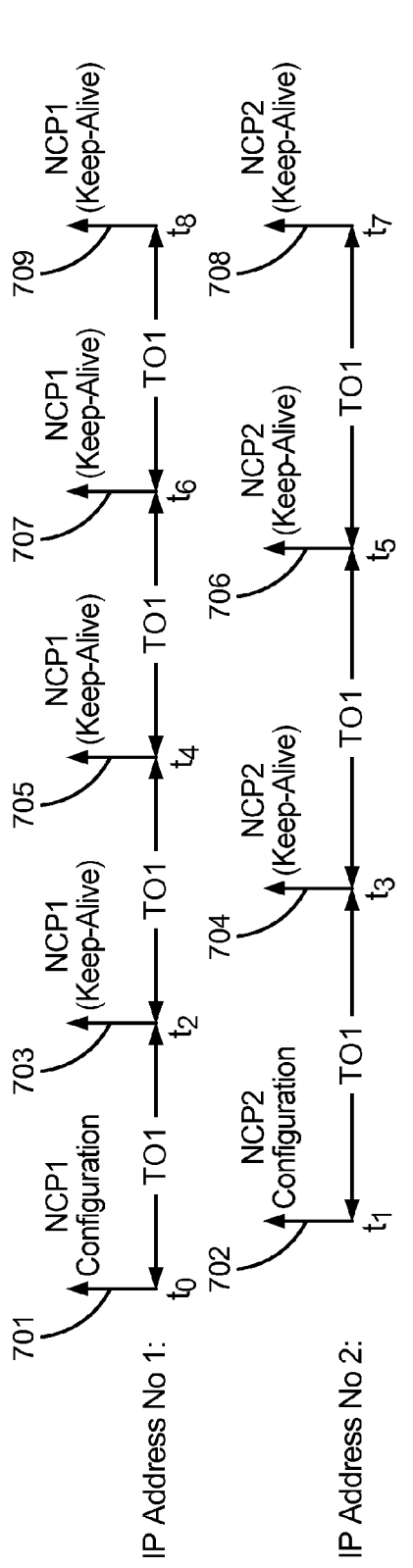
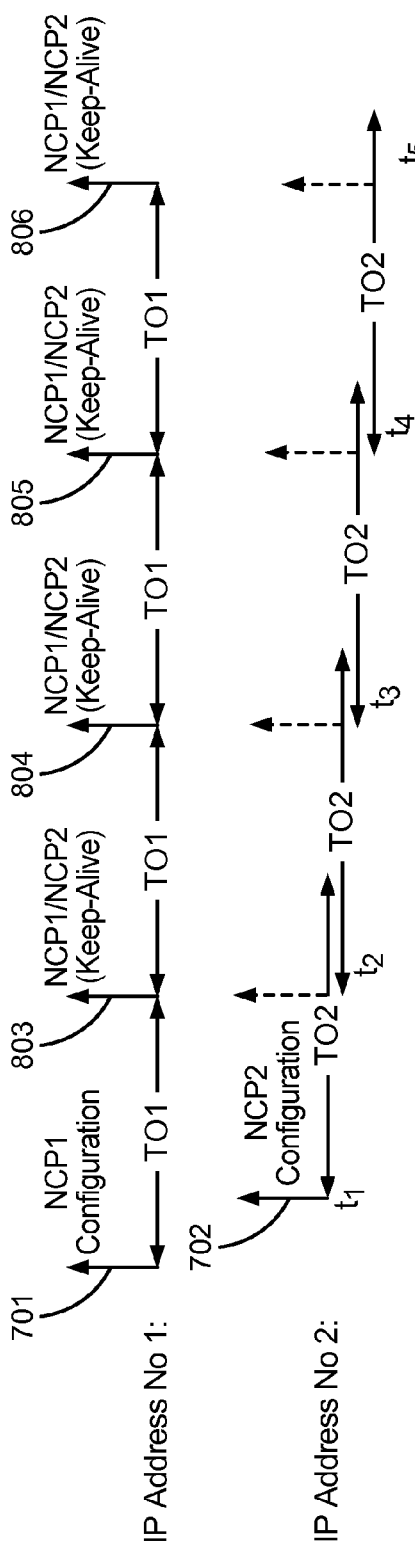
FIG. 7
FIG. 8

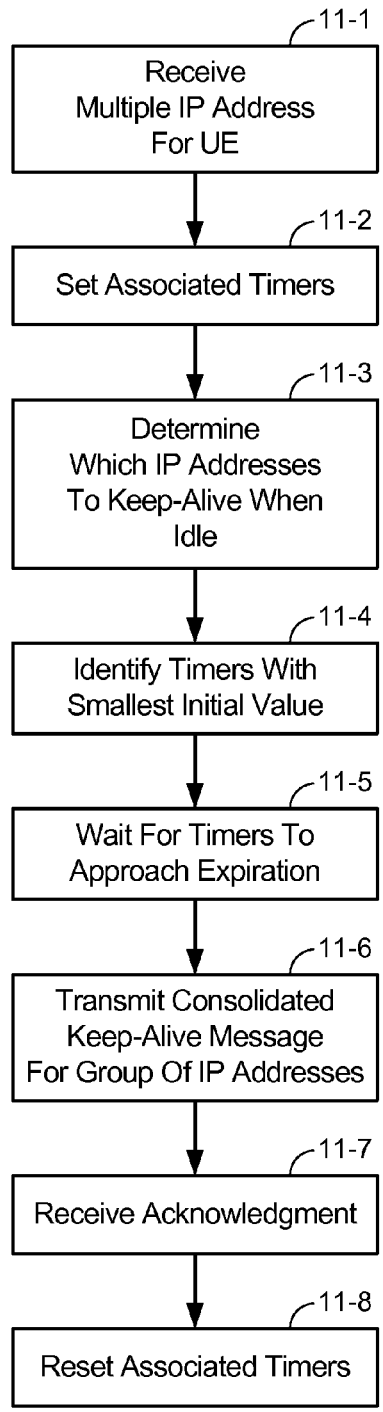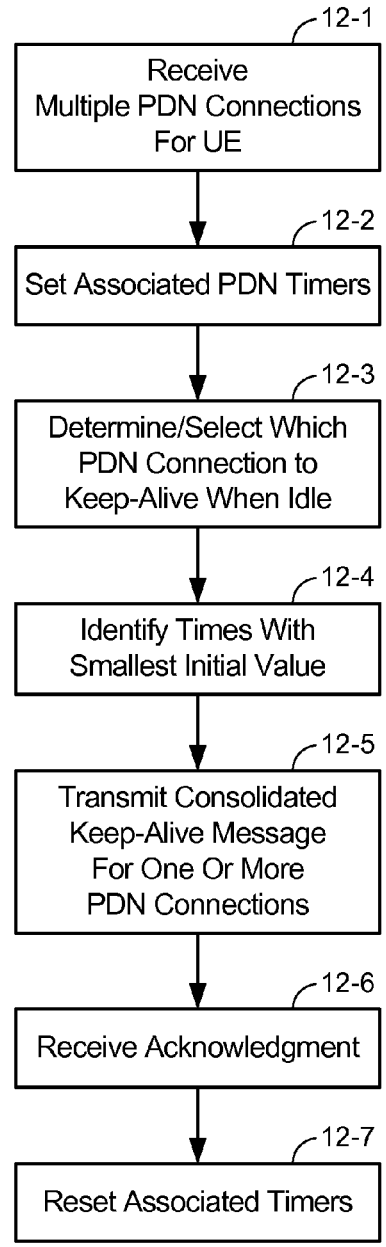
FIG. 11
FIG. 12

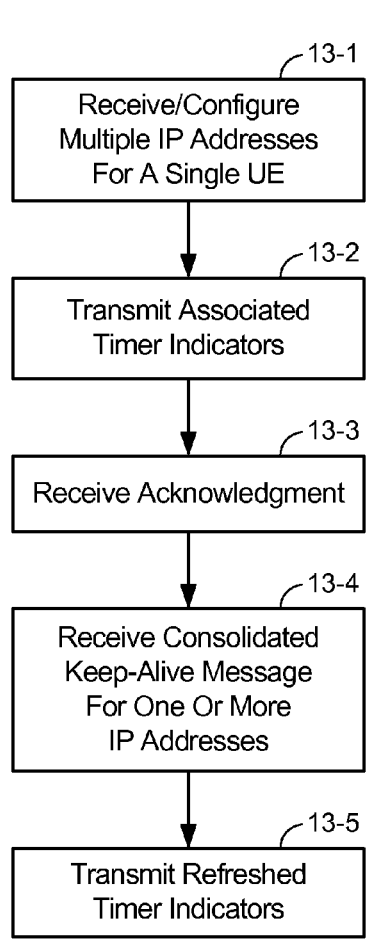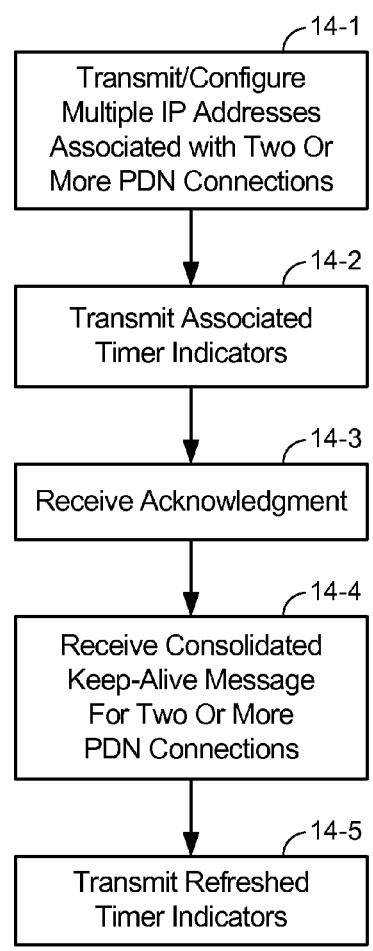
FIG. 13
FIG. 14

SYSTEMS, METHODS, AND APPARATUS FOR MANAGING IP ADDRESSES AND NETWORK TRAFFIC IN WIRELESS NETWORKS

CROSS-REFERENCE TO RELATED APPLICATIONS

This application claims priority from U.S. Provisional Patent Application No. 61/406,108, entitled "SYSTEMS, METHODS AND APPARATUS FOR MANAGING IP ADDRESSES & NETWORK TRAFFIC IN WIRELESS NETWORKS", filed Oct. 22, 2010, which is incorporated by reference in its entirety.

BACKGROUND

1. Field

The present application relates to wireless communication, and in particular, to systems, methods and apparatus to enable management wireless network resources.

2. Background

The popularity of high-rate wireless data services is increasing the demand for wireless channel access and Internet Protocol (IP) addresses in wireless networks.

On the one hand, the ability to satisfy the demand for wireless channel access is often limited by a lack of available frequency spectrum that may be used for reliable communications within a particular geographic area. Given the limitations of the natural frequency spectrum there is a challenge in accommodating the increasing demand for wireless channel access.

On the other hand, the ability to satisfy demand for IP addresses (or more generally packet data network connections) can also be limited by the number of available IP addresses that can be assigned within the network. To alleviate demand, IP addresses are often dynamically assigned to mobile devices or other access terminals to enable IP address reuse. That is, once an access terminal no longer needs the assigned IP address, the access terminal is able to release the IP address back to the network, or the network forces the access terminal to relinquish the IP address when the access terminal is inactive on the associated traffic channel. However, in instances where the access terminal wants to keep an IP address, despite not actively using the associated traffic channel, the access terminal sends a keep-alive message to prevent the network from forcing the access terminal to relinquish the IP address. These keep-alive messages increase the demand for channel access, increase access terminal signal processing to receive and respond to the keep-alive messages, and consume available battery power in mobile access terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage monitoring of a page channel or the like.

In one aspect, a method is provided. The method includes receiving two or more network addresses from a network, each network address having an associated timer and an associated data traffic channel. The method further includes transmitting a consolidated keep-alive message in order to refresh the timers associated with a group of the two or more network addresses each network address being associated with a different device. In some implementations, the one or more network addresses are provided with a Packet Data Network (PDN) connection, and the PDN connection is associated with a timer. In some implementations, some of the network addresses are included in a single PDN connection. In some implementations, the network addresses are included in two or more PDN connections, wherein each PDN connection includes at least one network address. The method may further include identifying idle data traffic channels and the associated network addresses. The method may also include determining whether to maintain the associated network address for each idle data traffic channel. The method may also include consolidating keep-alive messages for identified network addresses. The method may include receiving an acknowledgement in response to the transmitted consolidated keep-alive message. In some implementations, the method includes refreshing the timers associated with the acknowledgement.

In another innovative aspect, an apparatus is provided. The apparatus includes a receiver configured to receive two or more network addresses from a network, each network address having an associated timer and an associated data traffic channel. The apparatus further includes a transmitter configured to transmit a consolidated keep-alive message in order to refresh the timers associated with a group of the two or more network addresses each network address being associated with a different device. In some implementations the one or more network addresses are provided with a Packet Data Network (PDN) connection, and the PDN connection is associated with a timer. In some implementations, some of the network addresses are included in a single PDN connection. In some implementations, the network addresses are included in two or more PDN connections, wherein each PDN connection includes at least one network address. The apparatus may include a processing system. The processing system may be configured to identify idle data traffic channels and the associated network addresses. The processing system may be configured to determine whether to maintain the associated network address for each idle data traffic channel. The processing system may also be configured to consolidate keep-alive messages for identified network addresses. The receiver may be further configured to receive an acknowledgement in response to the transmitted consolidated keep-alive message, and wherein the processing system is further configured to refresh the timers associated with the acknowledgement.

Another apparatus is provided in an additional innovative aspect. The apparatus includes means for receiving two or more network addresses from a network, each network address having an associated timer and an associated data traffic channel. The apparatus also includes means for transmitting a consolidated keep-alive message in order to refresh the timers associated with a group of the two or more network addresses each network address being associated with a different device. In some implementations, the one or more network addresses are provided with a Packet Data Network (PDN) connection, and the PDN connection is associated with a timer. In some implementations, some of the network addresses are included in a single PDN connection. Tithe network addresses may be included in two or more PDN connections, wherein each PDN connection may include at least one network address. The apparatus may also include means for processing. The processing means may be configured to identify idle data traffic channels and the associated network addresses. The processing means may be configured to determine whether to maintain the associated network address for each idle data traffic channel. The processing means may be further configured to consolidate keep-alive messages for identified network addresses. In some example implementations, the receiving means may be further configured to receive an acknowledgement in response to the transmitted consolidated keep-alive message, and wherein the processing means is further configured to refresh the timers associated with the acknowledgement.

In still another innovative aspect, a computer program product for wirelessly communicating comprising a computer readable medium comprising instructions is provided. The instructions, executable by a processor of an apparatus, cause the apparatus to receive two or more network addresses from a network, each network address having an associated timer and an associated data traffic channel. The instructions further cause the apparatus to transmit a consolidated keep-alive message in order to refresh the timers associated with a group of the two or more network addresses each network address being associated with a different device. The instructions may also cause the apparatus to identify idle data traffic channels and the associated network addresses. The instructions may also cause the apparatus to determine whether to maintain the associated network address for each idle data traffic channel. The instructions may also cause the apparatus to consolidate keep-alive messages for identified network addresses. The instructions may also cause the apparatus to receive an acknowledgement in response to the transmitted consolidated keep-alive message. In some implementations, the instructions cause the apparatus to refresh the timers associated with the acknowledgement.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 is a simplified timing diagram of a keep-alive signaling implementation.

FIG. 8 is a simplified timing diagram of a keep-alive signaling implementation.

FIG. 11 is a flowchart of an implementation of a method.

FIG. 12 is a flowchart of an implementation of a method.

FIG. 13 is a flowchart of an implementation of a method.

FIG. 14 is a flowchart of an implementation of a method.

Figure 1:
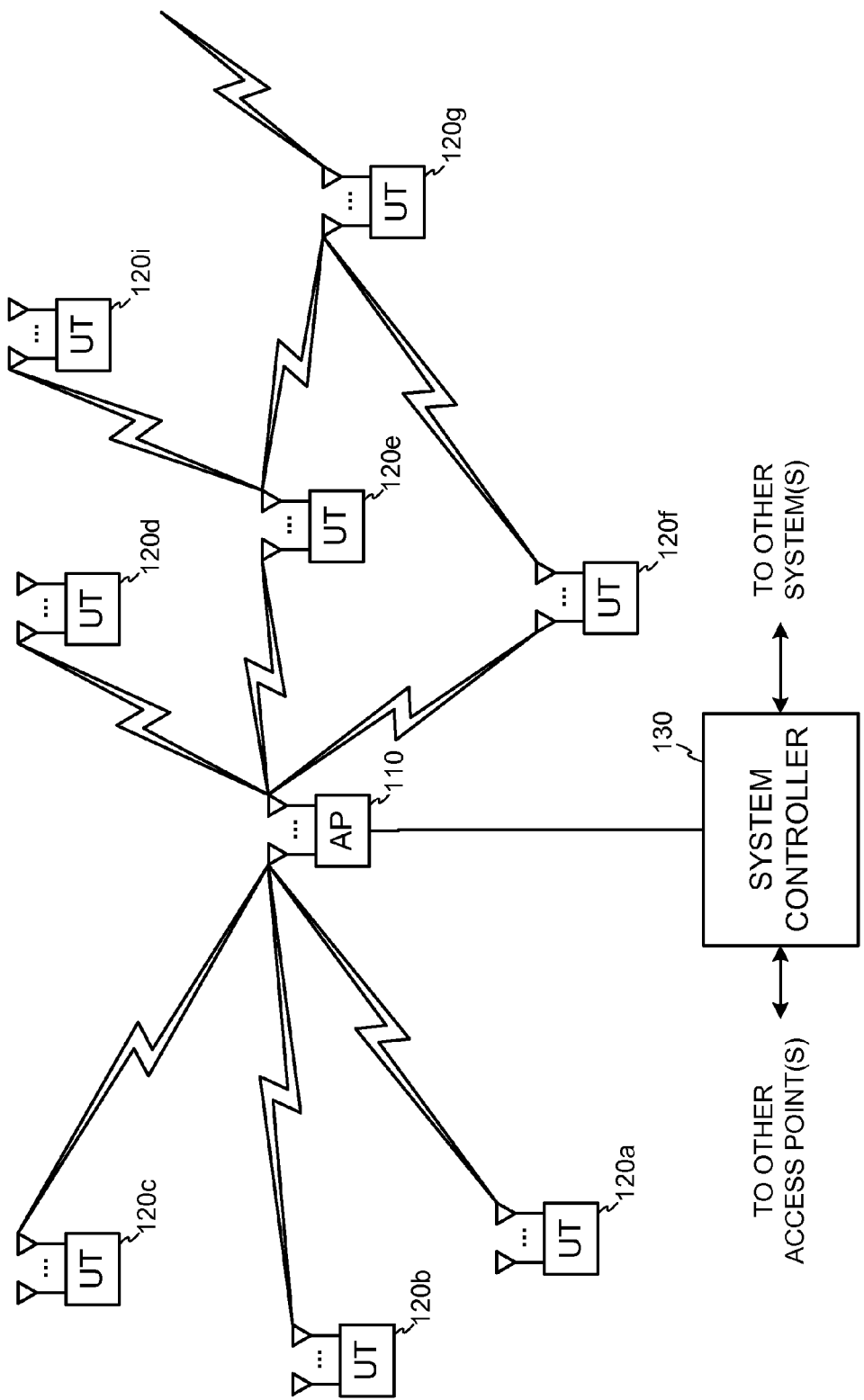
FIG. 1 is a diagram of a wireless communications network in accordance with certain aspects of the present disclosure.

In accordance with common practice the various features illustrated in the drawings may not be drawn to scale. Accordingly, the dimensions of the various features may be arbitrarily expanded or reduced for clarity. In addition, some of the drawings may not depict some of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3$^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As an AT or UE moves through such a network, the access terminal may be served in certain locations by ANs that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
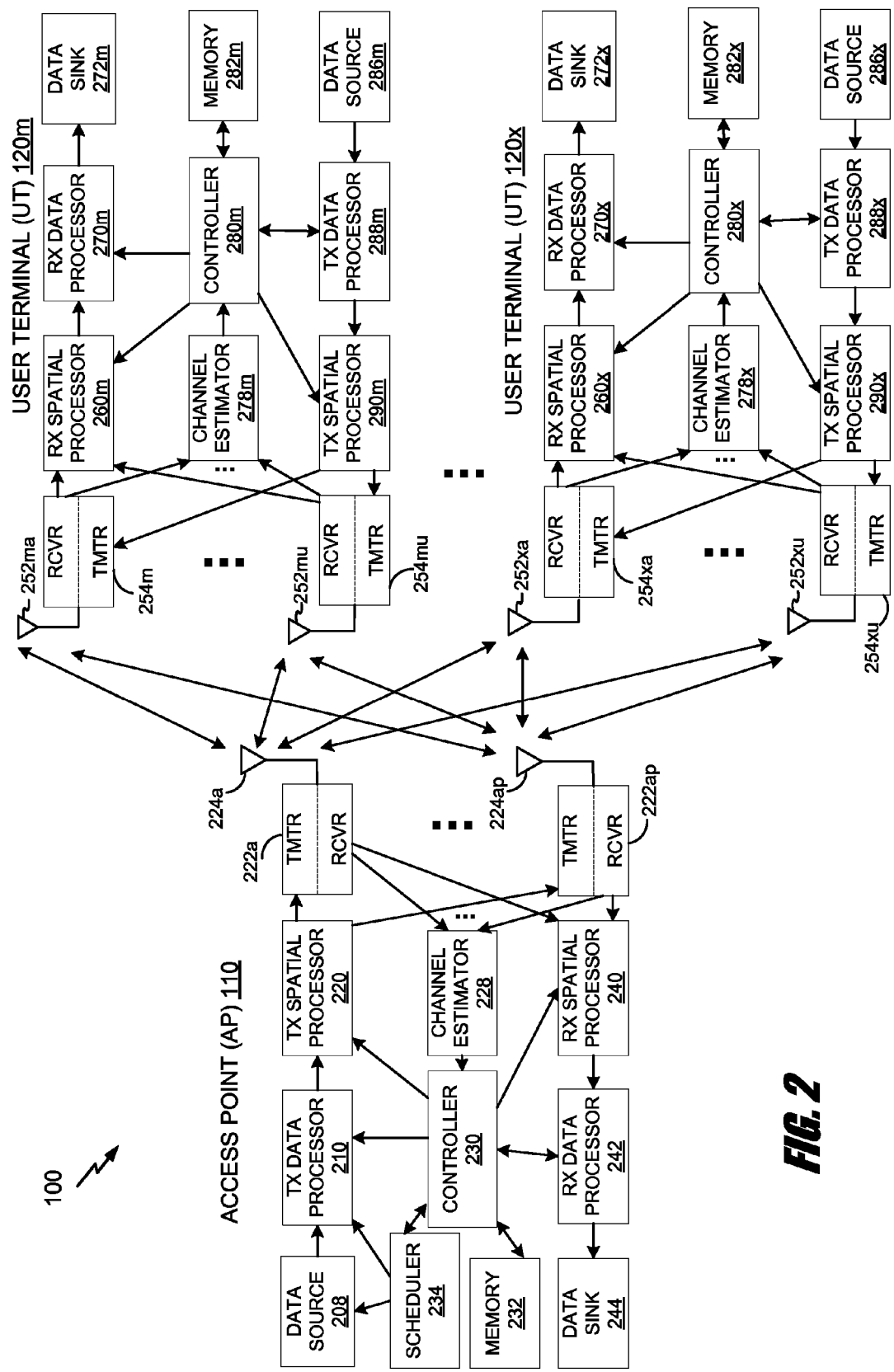
FIG. 2 is a block diagram of an example access point and user terminals in accordance with certain aspects of the present disclosure.

FIG. 2 illustrates a block diagram of access point 110 and two user terminals 120m and 120x in MIMO system 100. The access point 110 is equipped with N, antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from some $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
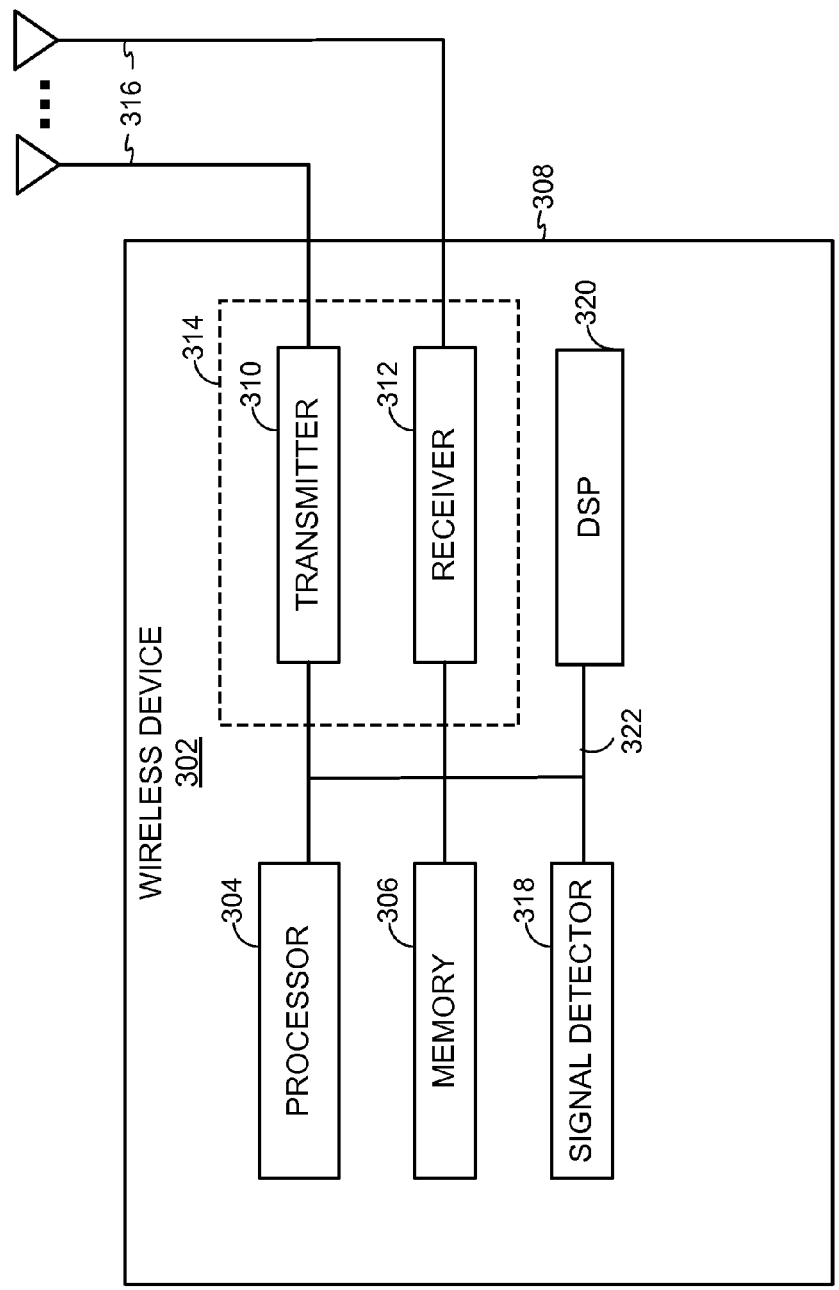
FIG. 3 is a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
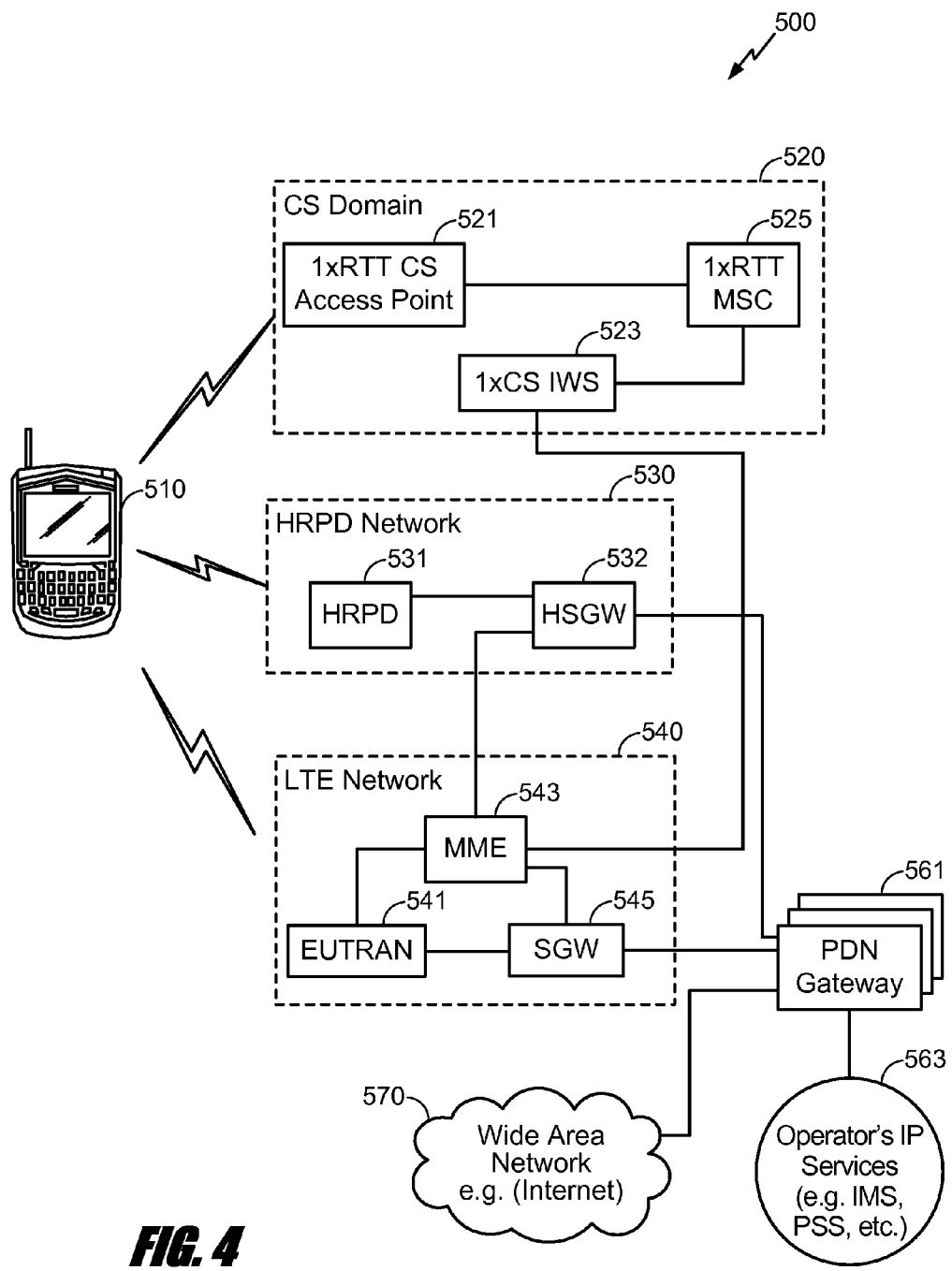
FIG. 4 is a simplified block diagram of several sample aspects of communication components.

FIG. 4 is a simplified block diagram of several sample aspects of a communication system 500. The system 500 includes a circuit-switched (CS) domain (or network) 520, a high rate packet data (HRPD) network 530, an LTE packet-switched (PS) network 540, a packet data network (PDN) gateway 561, an operator's IP services center 563, and a wide area network 570. The system 500 also includes a mobile device or user equipment (UE) 510. While only one UE 510 has been illustrated in FIG. 4, those skilled in the art will appreciate that an LTE system may include any number of access terminals, mobile devices, UEs and the like.

Those skilled in the art will also appreciate that a CS domain of a wireless network may have more components than the simplified CS domain 520 illustrated in FIG. 4. The CS domain 520 illustrated in FIG. 4 includes only those components useful for describing some prominent features of implementations within the scope of the claims. The CS domain 520 includes a 1×RTT CS access node 521 (herein after referred to as "base station 521"), an interworking solution node (IWS) 523, and a mobile switching center (MSC) 525.

Those skilled in the art will also appreciate that an LTE PS network may have more components than the simplified LTE PS network 540 illustrated in FIG. 4. The LTE PS domain 540 illustrated in FIG. 4 only contains those components useful for describing some prominent features of implementations within the scope of the claims. The LTE PS domain 540 includes an evolved UMTS terrestrial radio access network (EUTRAN) node 541 configured according to LTE or a similar technology. The LTE PS domain 540 also includes a mobility management entity (MME) 543 and a packet data network serving gateway (SGW) 545. The SGW 545 is coupled to the PDN gateway 561.

Those skilled in the art will also appreciate that an HRPD network may have more components than the simplified HRPD network 530 illustrated in FIG. 4. The HRPD 530 illustrated in FIG. 4 only contains those components useful for describing some prominent features of implementations within the scope of the claims. The HRPD network 530 includes an HRPD access node (AN) 531 configured to provide an intra-frequency HRPD data service along with the CS voice service provided by the base station 521. The HRPD network 530 includes an HRPD serving gateway (HSGW) 532. The HSWG 532 is in communication with the MME 543 and the PDN gateway 561. The communication link between the HSWG 532 and MME 543 is used to exchange HRPD handover/channel assignment messages.

Those skilled in the art will also appreciate that a PDN may have more components than the PDN gateway 561 and operator's IP services center 563 illustrated in FIG. 4. Again FIG. 4 includes only those features useful for describing some prominent features of the implementations. The PDN gateway 562 is ultimately connected to a wide area network 570, such as the Internet.

If the UE 510 includes dual radio access capability it may be possible for the UE 510 to receive both CS voice service and PS data service simultaneously. There are at least two dual radio access schemes. The first may be referred to as inter-frequency dual radio access and the second may be referred to as intra-frequency dual radio access. According to an inter-frequency dual radio access scheme an access terminal is capable of establishing and maintaining two wireless communication links, which are each on a separate frequency band from the other. For example, the combination of LTE PS data service and CS voice service would typically be an inter-frequency dual radio access scheme because LTE PS data service and CS voice service are typically provided on separate frequency bands. On the other hand, according to an intra-frequency dual radio access scheme an access terminal is capable of establishing and maintaining two wireless communication links so long as the two wireless communication links are on the same frequency band. For example, the combination of HRPD PS data service and CS voice service would typically be an intra-frequency dual radio access scheme because HRPD PS data service and CS voice service are typically provided on the same frequency band.

In operation the MME 543 and the IWS 523 bridge the PS and CS domains 540, 520. For LTE service, the UE 510 accesses the PS domain 540 through the EUTRAN 541. For CS voice service the UE 510 accesses the CS domain 520 through the base station 521. If the UE 510 is initially "camped" or connected to the PS domain 540 when CS voice service is requested, the UE 510 undergoes a transfer of service from the EUTRAN 541 to the base station 521 (i.e. from the PS domain 540 to the CS domain 520).

However, some dual radio access transceivers, and even some network operators, do not support inter-frequency dual radio access, and thus cannot support the combination of LTE PS data service and CS voice service on separate frequency bands. Accordingly, in such a scenario, if the UE 510 is to concurrently maintain a link for CS voice service and another link for PS data service, the PS data service will have to be transferred to the HRPD network 530 when the CS fallback occurs. In other words, the LTE network 540, and specifically the EUTRAN 541, requires a procedure to concurrently handover service to at least two other radio access technologies. In the system 500 shown in FIG. 4, the two radio access technologies are 1×RTT and HRPD. However, those skilled in the art will appreciate that any two suitable radio access technologies may be used in combination without departing from the scope of the appended claims. Moreover, it is preferable to for the procedure to select the radio access technologies by utilizing and considering factors such as, for example, the types of services preferred by one or more users, the quality of service preferred by one or more users, how one or more users rank preferences, local policy, network wide policy, or other factors that are useful for selecting radio access technologies in order to support dual radio access.

High-rate date services can be provided to the UE 510 through either the HRPD network 530 or the LTE network 540. In one implementation, the UE 510 receives the high-rate data services from the operator's IP services center 563 through the PDN gateway 561. To that end, the UE 510 must establish a PDN connection with the PDN gateway 561 in order to receive at least one IP address.

In accordance with implementations described herein, a UE 510 can be assigned multiple IP addresses that can be used for different IP services. For example, the UE 510 can be assigned a first IP address for a voice of IP service and a second IP for a high-rate data connection. Those skilled in the art will appreciate from the disclosure herein that a UE 510 can be assigned any number of IP addresses.

There are also many options for how multiple IP addresses can be related to one or more PDN connections. For example, in one implementation each PDN connection from a particular PDN gateway has an associated single respective IP address. Additionally and/or alternatively, a single PDN connection from a particular PDN gateway includes one or more IP addresses associated with it. Additionally and/or alternatively, each PDN from a respective PDN gateway includes one or more IP addresses associated with it. Those skilled in the art will appreciate that each IP address and/or PDN connection is associated with a respective data traffic channel over which a UE sends and/or receives data.

However, the ability to satisfy demand for IP addresses or PDN connections can be limited by the number of available IP addresses that can be assigned within the network. To alleviate demand, IP addresses are often dynamically assigned to UEs to enable IP address reuse. That is, once a UE no longer needs the assigned IP address, the UE is able to release the IP address back to the network, or the network forces the UE to relinquish the IP address when the UE is inactive on the associated traffic channel.

In one implementation, each IP address and/or PDN connection has an associated timer that is maintained at the PDN gateway 561 or another convenient node, as well as at the UE 510. So long as the timer has not expired the UE 510 can maintain the IP address and/or PDN connection. When the associated traffic channel for a particular IP address and/or PDN connection is in use, the PDN gateway 561 may be configured to automatically refresh a respective timer and indicator sent to the UE 510, which in turn resets a local timer. This allows the UE 510 to keep the assigned IP address and/or PDN connection while the UE 510 is using the traffic channel. On the other hand, if UE 510 determines a need to maintain an IP address and/or PDN connection, despite not actively using the associated data traffic channel, the UE sends a keep-alive message for that IP address and/or PDN connection. The keep-alive message forces the PDN gateway 561 to refresh the respective timer and indicator sent to the UE 510 to allow the UE 510 to maintain the IP address and/or PDN connection.

These keep-alive messages increase the demand for channel access, and consume available battery power in mobile access terminals. The problem may be compounded when the UE 510 is assigned multiple IP addresses and/or established multiple PDN connections. Each of the associated timers may be vendor specific and/or have different initial values, and will likely run asynchronously with respect to one another. In turn, if UE 510 determines a need to maintain multiple IP addresses and/or PDN connections, despite not actively using the associated data traffic channels, the UE 510 will send individual keep-alive messages for each IP address and/or PDN connection. Multiple keep-alive messages for different channels will increase the wireless network traffic load, and thus increase demand for wireless channel access. Moreover, having to transmit multiple keep-alive messages for different channels will also increase battery consumption at the UE 510. Hence, there lies a challenge in allowing an access terminal to maintain dynamically allocated IP addresses and/or PDN connections while reducing both the amount of network traffic and battery consumption associated with the maintaining the IP addresses and/or PDN connections.

Systems, methods and apparatus described herein include features that enable more efficient management of keep-alive messages utilized to maintain IP addresses and/or PDN connections associated with idle data traffic channels. In one implementation, an access terminal consolidates keep-alive messages for idle data traffic channels, so as to reduce the number of keep-alive messages transmitted. In one implementation, an access terminal selects which of the idle data traffic channels to maintain, and transmits a consolidated keep-alive message for associated IP addresses and/or PDN connections. In one implementation, timers are associated with PDN connections and sub-timers are associated with IP addresses covered by a particular PDN connection. In such an implementation, keep-alive messages can be consolidated based on the timers, the sub-timers and/or a combination of timers and sub-timers. In a complementary method, a PDN gateway or another convenient network node, cooperates with one or access terminals to reduce network traffic. In another complementary method, the PDN gateway or another convenient network node synchronizes the timers and/or sub-timers provided with a particular access terminal.

Figure 5:
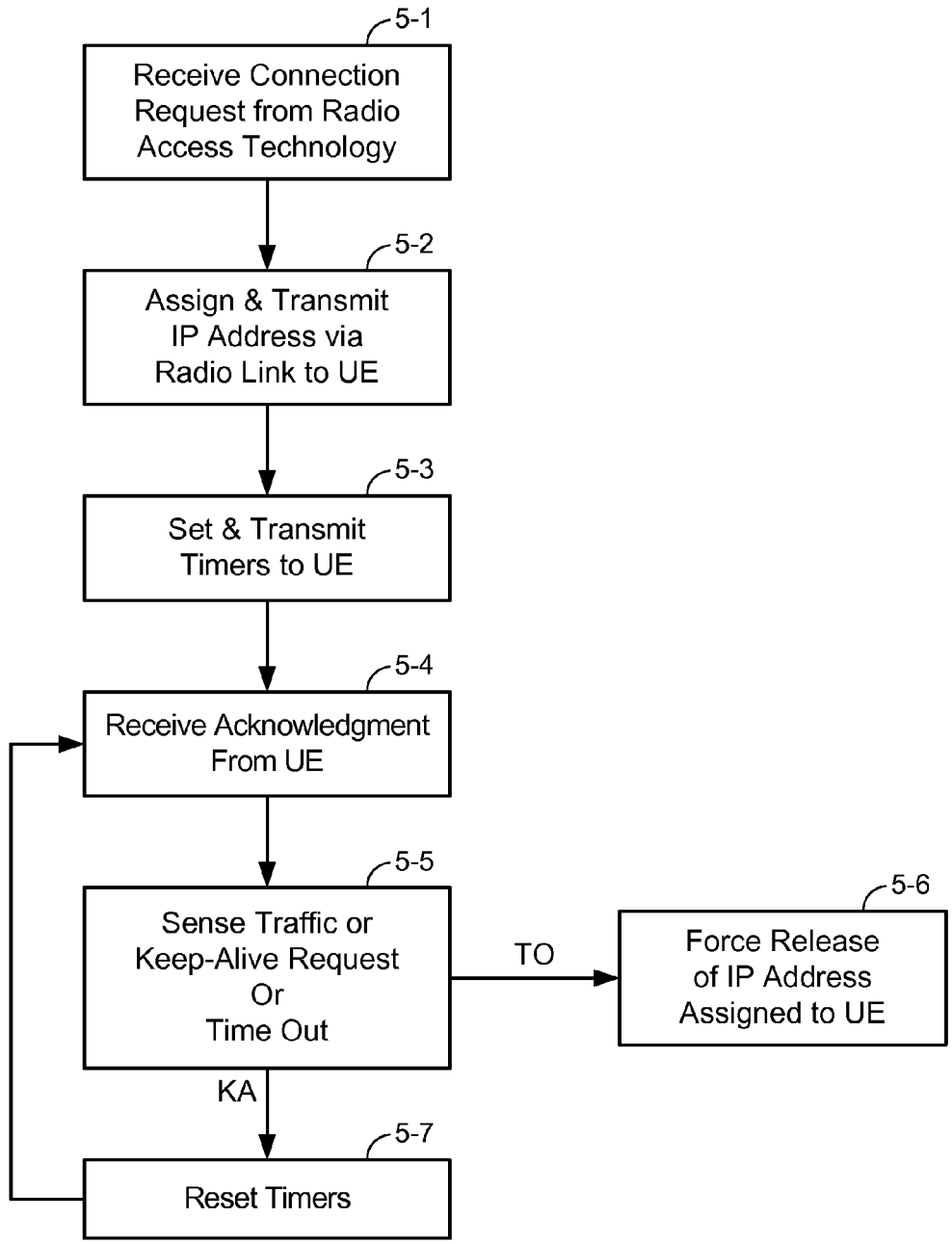
FIG. 5 is a flowchart of an implementation of a method.

FIG. 5 is a flowchart of an implementation of a method. In one implementation the method is performed by a PDN gateway or analogously configured node. As represented by block 5-1, the method includes receiving a connection request from a UE through a radio access technology (e.g. an LTE network or HRPD network). As represented by block 5-2, the method includes assigning and transmitting an IP address via the radio link to the requesting UE. As represented by block 5-3, the method includes setting and transmitting a timer associated with the assigned IP address to the UE. As represented by block 5-4, the method includes receiving an acknowledgement from the UE. As represented by block 5-5, the method includes sensing traffic (or a keep-alive message) on the associated data traffic channel or timing out if the data traffic channel is idle. If the UE is using the data traffic channel or sends a keep-alive message (keep-alive (KA) path from 5-5), as represented by block 5-7, the method includes resetting the associated timer. On the other hand, if the data traffic channel is idle and the timer expires and/or crosses a threshold (time out (TO) path from 5-5), as represented by block 5-6, the network forces the release of the IP address assigned to the UE.

Figure 6:
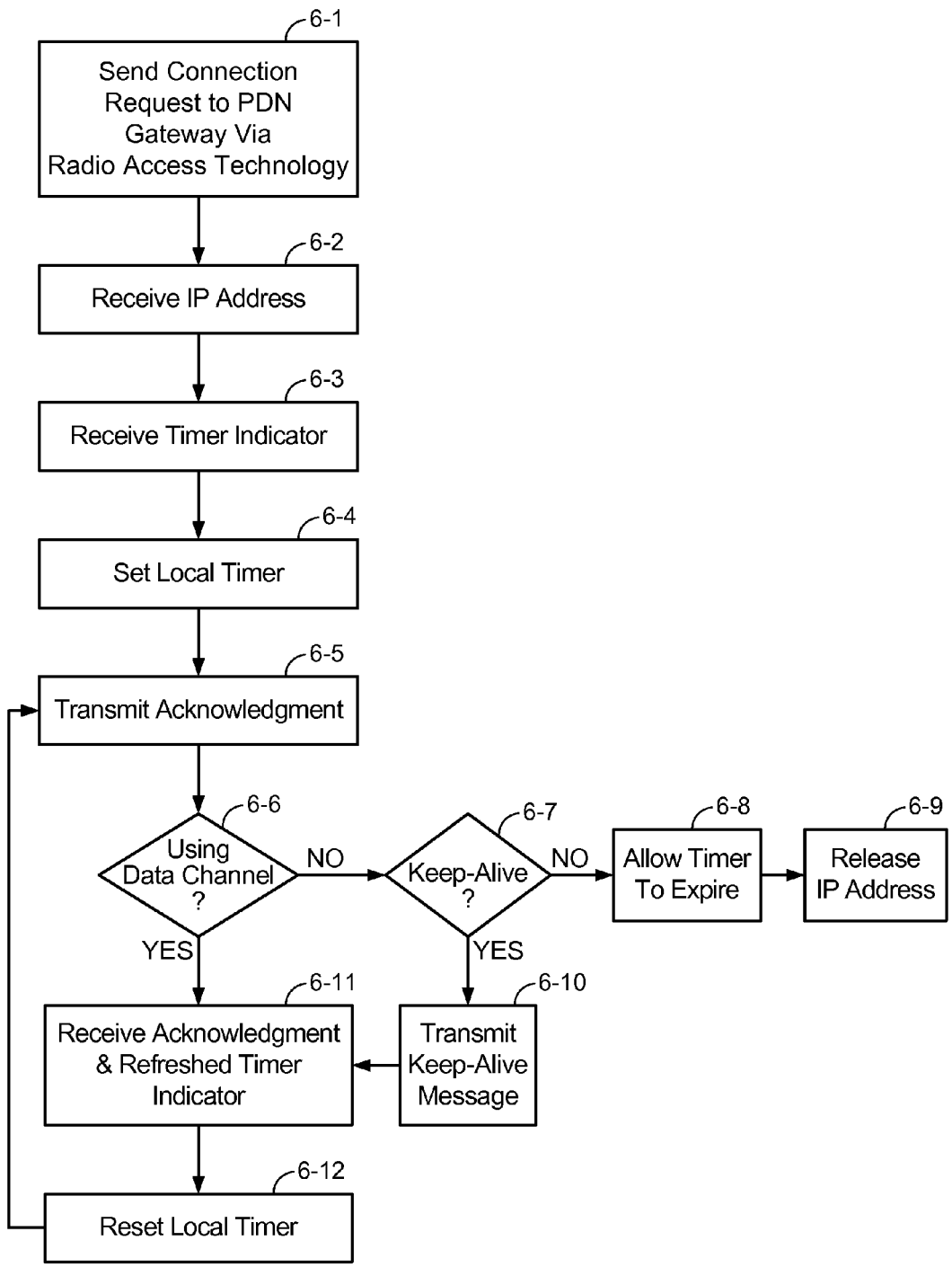
FIG. 6 is a flowchart of an implementation of a method.

FIG. 6 is a flowchart of an implementation of a method. In one implementation the method is performed by a UE or analogously configured device. As represented by block 6-1, the method includes transmitting a connection request to the PDN gateway through a radio access technology (e.g. an LTE network or HRPD network). As represented by block 6-2, the method includes receiving an IP address via the radio link from the requesting PDN gateway. As represented by block 6-3, the method includes receiving a timer indicator associated with the assigned IP address from the PDN gateway. As represented by block 6-4, the method includes setting a local timer. As represented by block 6-5, the method includes transmitting an acknowledgement to the PDN gateway.

As represented by block 6-6, the method includes determining whether the associated data traffic channel is in use or is idle. If the UE is using the associated data traffic channel (Yes path from 6-6), as represented by block 6-11, the UE receives either an explicit or implicit acknowledgement from the PDN gateway and a refreshed timer indicator. As represented by block 6-12, the method includes resetting the local timer before returning to the portion of the method represented by block 6-5.

Referring again to block 6-6, if the data traffic channel is idle (No path from 6-6), as represented by block 6-7, the method includes determining whether or not to send a keep-alive message to allow the UE to hold on to the assigned IP address. If the UE determines that there is no reason to send the keep alive message (No path from 6-7), as represented by block 6-8, the UE allows the timer to expire or cross a threshold. As represented by block 6-9, the method includes releasing the assigned IP address back to the network. On the other hand, if the UE determines that there is a reason to send the keep alive message (Yes path from 6-7), as represented by block 6-10, the method includes transmitting a keep-alive message before proceeding to the portion of the method represented by block 6-11.

FIG. 7 is a simplified timing diagram of a keep-alive signaling implementation for first and second IP addresses assigned to a UE. For ease of explanation, FIG. 7 will be described as an implementation where the addresses are assigned to the same UE. However, in some implementations, the addresses may be assigned to multiple, different UEs. At time t0 the UE transmits a configuration message 701 for the first IP address. At time t1, the UE transmits a configuration message 702 for the second IP address. The first and second IP addresses have first and second respective timers (not shown). The first timer has an initial refresh value of TO1, and the second timer has an initial refresh value of TO2, which is greater than TO1. As such, without any active management, in order to maintain the IP addresses when they are both in active, the UE must transmit keep-alive messages 703, 705, 707, 709 (etc.) at each time t2, t4, t6, t7 the first timer is about the expire, and also transmit keep-alive messages 704, 706, 708 (etc.) at each time t3, t5, t7 the second timer is about the expire. As noted above, each keep-alive transmission adds to the demand for channel access and consumes battery power.

FIG. 8 is a simplified timing diagram of a keep-alive signaling implementation in accordance with aspects disclosed herein. FIG. 8 is similar to and adapted from FIG. 7. As such, only the differences between FIGS. 7 and 8 are described for the sake of brevity. Instead of transmitting keep-alive messages for each IP address independently, consolidated keep-alive messages 803, 804, 805, 806 are transmitted to refresh the first and second local timers together at times t2, t3, t4 and t5. The duration between the consolidated keep-alive messages 803, 804, 805, 806 is approximately equal to the initial refresh value TO1 belonging to the first IP address. In the example illustrated, since initial refresh value TO2 belonging to the second IP address is greater than TO1, the second local timer associated with the second IP address is refreshed more frequently than if independent keep-alive messages were sent to maintain the second IP address. However, by refreshing the second local timer more often as described, the amount of network traffic is reduced, and in some implementations, the battery power consumed is also reduced.

Figure 9:
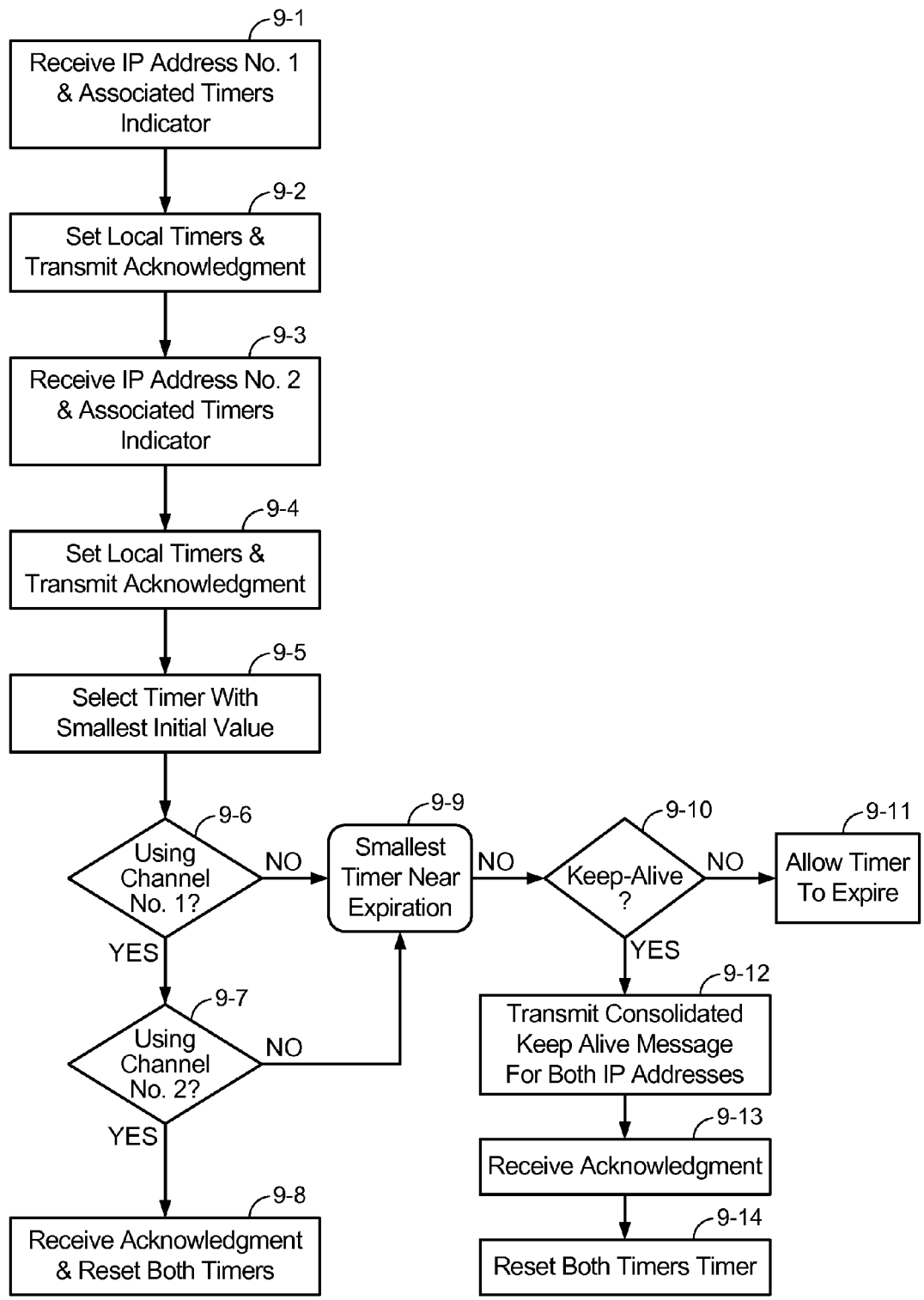
FIG. 9 is a flowchart of an implementation of a method.

FIG. 9 is a flowchart of an implementation of a method. In one implementation the method is performed by a UE or analogously configured device. As represented by block 9-1, the method includes receiving a first IP address and an associated timer indicator. As represented by block 9-2, the method includes setting a first local timer and transmitting an acknowledgement to complete the configuration for the data traffic channel associated with the first IP address. As represented by block 9-3, the method includes receiving a second IP address and an associated timer indicator. As represented by block 9-4, the method includes setting a second local timer and transmitting an acknowledgement to complete the configuration for the data traffic channel associated with the second IP address. As represented by block 9-5, the method includes selecting which if the first and second timer has the smallest initial value.

As represented by block 9-6, the method includes determining whether the data traffic channel associated with the first IP address is in use or is idle. If the UE is using the associated data traffic channel (Yes path from 9-6), the method includes proceeding to the portion of the method represented by block 9-7. On the other hand, if the UE is not using the data traffic channel associated with the first IP address (No path from 9-6), as represented by block 9-9, the method includes determining if the previously selected timer is close to expiration (e.g. by having crossed a threshold). If the timer is close to expiration (No path from 9-9), as represented by block 9-10, the method includes determining whether or not to send a keep-alive message to allow the UE to hold on to both the first and second IP addresses.

If the UE determines that there is no reason to send the keep alive message (No path from 9-10), as represented by block 9-11, the UE allows the timers to expire or cross a threshold, signifying the release of one or both of the first and second IP addresses. On the other hand, if the UE determines that there is a reason to send the keep alive message (Yes path from 9-10), as represented by block 9-12, the method includes transmitting a keep-alive message. As represented by block 9-13, the method includes receiving an acknowledgement from the PDN gateway. As represented by block 9-13, the method includes resetting both the first and second local timers.

As represented by block 9-7, the method includes determining whether the data traffic channel associated with the second IP address is in use or is idle. If the UE is using the associated data traffic channel (Yes path from 9-7), as represented by block 9-8, the method includes receiving either an explicit or implicit acknowledgement from the PDN gateway and resetting both the first and second local timers.

Figure 10:
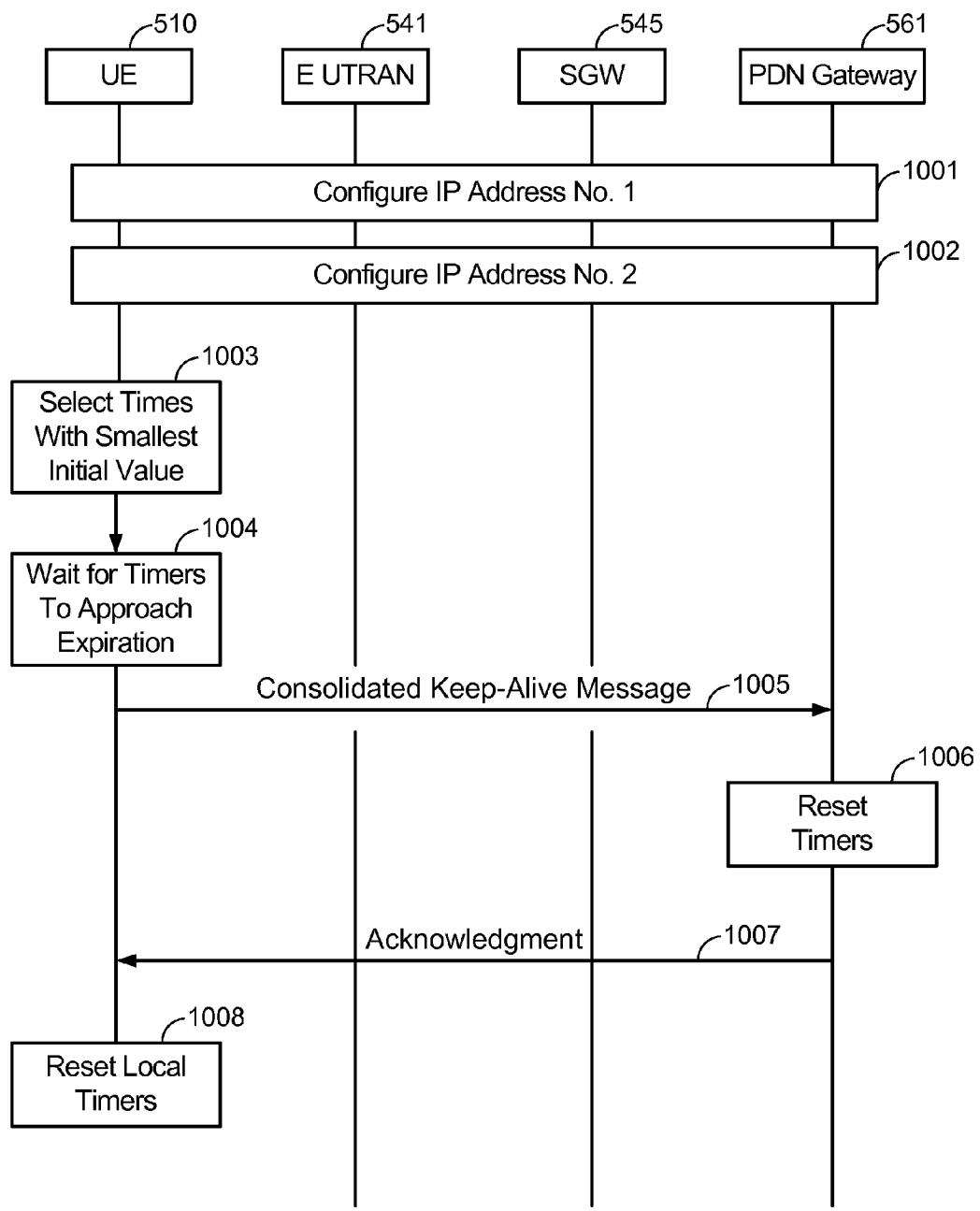
FIG. 10 is a signaling diagram illustrating transmissions between some of the components of FIG. 4.

FIG. 10 is a signaling diagram illustrating transmissions between some of the components of FIG. 4. As represented by signal 1001, the UE 510 and PDN gateway 561 configure the assignment of a first IP address and an associated data traffic channel. As represented by signal 1002, the UE 510 and PDN gateway 561 configure the assignment of a second IP address and an associated data traffic channel. As represented by block 1003, the UE 510 selects which of the first and second timer has the smallest initial value. As represented by block 1004, the UE 510 waits for the selected timer to approach expiration, by for example, waiting for the selected timer to cross a threshold value. As represented by signal 1005, the UE 510 transmits a consolidated keep-alive message to the PDN gateway 563. The consolidated keep-alive message replaces two messages that would otherwise be sent to maintain the first and second IP addresses independently. As represented by block 1006, the PDN gateway 563 resets the timers associated with the first and second IP addresses. As represented by signal 1007, the PDN gateway 563 transmits an acknowledgement to the UE 510. In response, as represented by block 1008, the UE 510 resets the local timers associated with the first and second IP addresses.

FIG. 11 is a flowchart of an implementation of a method. In one implementation the method is performed by a UE or analogously configured device. As represented by block 11-1, the method includes receiving multiple IP addresses and configuring the corresponding data traffic channels. As represented by block 11-2, the method includes setting a local timer for each of the IP addresses. As represented by block 11-3, the method includes identifying a group of the IP addresses to maintain once in an idle mode. As represented by block 11-4, the method includes identifying the local timer of the chosen IP addresses having the smallest initial value. As represented by block 11-5, the method includes waiting for the identified timer to approach expiration, by, for example, determining when that particular timer crosses a threshold. As represented by block 11-6, the method includes transmitting a consolidated keep-alive message for the group of identified IP addresses. As represented by block 11-7, the method includes receiving an acknowledgement from the PDN gateway. As represented by block 11-8, the method includes resetting the local timers associated with the group of identified IP addresses before looping back to the portion of the method represented by block 11-3.

FIG. 12 is a flowchart of an implementation of a method. In one implementation the method is performed by a UE or analogously configured device. In one implementation the method is performed by a UE or analogously configured device. As represented by block 12-1, the method includes receiving multiple PDN connections and configuring the corresponding data traffic channels. As represented by block 12-2, the method includes setting a local timer for each of the PDN connections. As represented by block 12-3, the method includes identifying a group of PDN connections to maintain once in an idle mode. As represented by block 12-4, the method includes identifying the local timer of the chosen PDN connections having the smallest initial value. As represented by block 12-5, the method includes waiting for the identified timer to approach expiration, by, for example, determining when that particular timer crosses a threshold. As represented by block 12-6, the method includes transmitting a consolidated keep-alive message for the group of PDN connections. As represented by block 12-7, the method includes receiving an acknowledgement from the PDN gateway. As represented by block 12-8, the method includes resetting the local timers associated with the group of identified PDN connections before looping back to the portion of the method represented by block 12-3.

FIG. 13 is a flowchart of an implementation of a method. In one implementation the method is performed by a PDN gateway or analogously configured node. As represented by block 13-1, the method includes transmitting multiple IP addresses to a single UE. As represented by block 13-2, the method includes transmitting associated timer indicators corresponding to the multiple IP addresses. As represented by block 13-3, the method includes the PDN gateway receiving an acknowledgement from the UE. As represented by block 13-4, the method includes receiving a consolidated keep-alive message for two or more of the IP addresses assigned to the UE. As represented by block 13-5, the method includes transmitting refreshed timer indicators for each of the two or more IP addresses identified in the consolidated keep-alive message.

FIG. 14 is a flowchart of an implementation of a method. In one implementation the method is performed by a PDN gateway or analogously configured node. As represented by block 14-1, the method includes transmitting multiple IP addresses to a single UE. The IP addresses are associated with two or more PDN connections. That is, each of two or more PDN connections assigns one or more IP addresses to single UE. As represented by block 14-2, the method includes transmitting associated timer indicators corresponding to the multiple IP addresses. As represented by block 14-3, the method includes the PDN gateway receiving an acknowledgement from the UE. As represented by block 14-4, the method includes receiving a consolidated keep-alive message for two or more of the IP addresses assigned to the UE. As represented by block 14-5, the method includes transmitting refreshed timer indicators for each of the two or more IP addresses identified in the consolidated keep-alive message.

Figure 15:
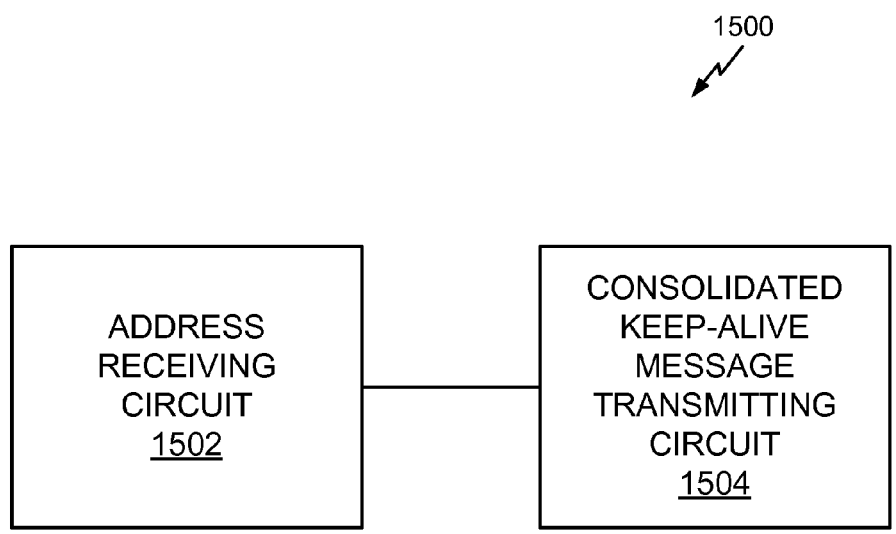
FIG. 15 shows a functional block diagram of another keep-alive signaling implementation.

FIG. 15 shows a functional block diagram of another keep-alive signaling implementation. Those skilled in the art will appreciate that a keep-alive signaling implementation may have more components than the simplified keep-alive signaling implementation 1500 illustrated in FIG. 15. The keep-alive signaling implementation 1500 shown in FIG. 15 includes only those components useful for describing some prominent features of implementations of certain aspects.

The keep-alive signaling implementation 1500 may include an address receiving circuit 1502 and a consolidated keep-alive message transmitting circuit 1504. In one implementation, the address receiving circuit 1502 is configured to receive two or more network addresses from a network, each network address having an associated timer and an associated data traffic channel. In some implementations, the means for receiving two or more network addresses from a network includes an address receiving circuit 1502. In one implementation, the consolidated keep-alive message transmitting circuit 1504 is configured to transmit a consolidated keep-alive message in order to refresh the timers associated with a group of the two or more network addresses each network address being associated with a different device. In some implementations, the means for transmitting a consolidated keep-alive message includes a consolidated keep-alive message transmitting circuit 1504.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method comprising:
receiving, at an electronic communication device, a plurality of network addresses from a network, each network address having an associated timer and an associated data traffic channel; and
transmitting, from the electronic communication device to the network, a consolidated keep-alive message identifying two or more network addresses of the plurality of network addresses, the consolidated keep alive message causing a refresh of the timers associated with each of the two or more network addresses, each network address identifying a different device providing a service via an associated data traffic channel to the electronic communication device, wherein said transmitting occurs at a point in time nearest to a timeout indicated by a timer associated with an identified network address having a lowest time remaining until timeout from amongst the timers for the identified network addresses.

2. The method of claim 1, wherein the network addresses are provided with a Packet Data Network (PDN) connection, and the PDN connection is associated with a timer.

3. The method of claim 2, wherein at least one of the network addresses are included in a single PDN connection.

4. The method of claim 2, wherein the network addresses are included in two or more PDN connections, wherein each PDN connection includes at least one network address.

5. The method of claim 1, further comprising:
identifying idle data traffic channels and the associated network addresses;
determining whether to maintain the associated network address for each idle data traffic channel; and
consolidating keep-alive messages for the network addresses determined to be maintained.

6. The method of claim 1, further comprising:
receiving, at the electronic communication device, an acknowledgement in response to the transmitted consolidated keep-alive message; and
refreshing the timers associated with the acknowledgement.

7. An apparatus comprising:
a receiver configured to receive a plurality of network addresses from a network, each network address having an associated timer and an associated data traffic channel; and
a transmitter configured to transmit, to the network, a consolidated keep-alive message identifying two or more network addresses of the plurality of network addresses, the consolidated keep alive message causing a refresh of the timers associated with each of the two or more network addresses, each network address identifying a different device providing a service via an associated data traffic channel to the apparatus, wherein said transmitting occurs at a point in time nearest to a timeout indicated by a timer associated with an identified network address having a lowest time remaining until timeout from amongst the timers for the identified network addresses.

8. The apparatus of claim 7, wherein the network addresses are provided with a Packet Data Network (PDN) connection, and the PDN connection is associated with a timer.

9. The apparatus of claim 8, wherein at least one of the network addresses are included in a single PDN connection.

10. The apparatus of claim 8, wherein the network addresses are included in two or more PDN connections, wherein each PDN connection includes at least one network address.

11. The apparatus of claim 7, further comprising:
a processing system configured to:
identify idle data traffic channels and the associated network addresses;
determine whether to maintain the associated network address for each idle data traffic channel; and
consolidate keep-alive messages for the network addresses determined to be maintained.

12. The apparatus of claim 11, wherein the receiver is further configured to receive an acknowledgement in response to the transmitted consolidated keep-alive message, and wherein the processing system is further configured to refresh the timers associated with the acknowledgement.

13. An apparatus comprising:
means for receiving a plurality of network addresses from a network, each network address having an associated timer and an associated data traffic channel; and
means for transmitting, to the network, a consolidated keep-alive message identifying two or more network addresses of the plurality of network addresses, the consolidated keep alive message causing a refresh of the timers associated with each of the two or more network addresses, each network address identifying a different device providing a service via an associated data traffic channel to the apparatus, wherein said transmitting occurs at a point in time nearest to a timeout indicated by a timer associated with an identified network address having a lowest time remaining until timeout from amongst the timers for the identified network addresses.

14. The apparatus of claim 13, wherein the network addresses are provided with a Packet Data Network (PDN) connection, and the PDN connection is associated with a timer.

15. The apparatus of claim 14, wherein at least one of the network addresses are included in a single PDN connection.

16. The apparatus of claim 14, wherein the network addresses are included in two or more PDN connections, wherein each PDN connection includes at least one network address.

17. The apparatus of claim 13, further comprising:
means for processing configured to:
identify idle data traffic channels and the associated network addresses;
determine whether to maintain the associated network address for each idle data traffic channel; and
consolidate keep-alive messages for the network addresses determined to be maintained.

18. The apparatus of claim 17, wherein the receiving means is further configured to receive an acknowledgement in response to the transmitted consolidated keep-alive message, and wherein the processing means is further configured to refresh the timers associated with the acknowledgement.

19. A non-transitory computer readable medium comprising instructions that when executed cause an apparatus to:
receive a plurality of network addresses from a network, each network address having an associated timer and an associated data traffic channel; and
transmit, to the network, a consolidated keep-alive message identifying two or more network addresses of the plurality of network addresses, the consolidated keep alive message causing a refresh of the timers associated with each of the two or more network addresses, each network address identifying a different device providing a service via an associated data traffic channel to the apparatus, wherein said transmitting occurs at a point in time nearest to a timeout indicated by a timer associated with an identified network address having a lowest time remaining until timeout from amongst the timers for the identified network addresses.

20. The computer readable medium of claim 19, further comprising instructions that when executed cause the apparatus to:
identify idle data traffic channels and the associated network addresses;
determine whether to maintain the associated network address for each idle data traffic channel; and
consolidate keep-alive messages for the network addresses determined to be maintained.

21. The computer readable medium of claim 20, further comprising instructions that when executed cause the apparatus to:
receive an acknowledgement in response to the transmitted consolidated keep-alive message; and
refresh the timers associated with the acknowledgement.

* * * * *